Feb. 23, 1926.
P. M. SMITH
1,574,209
STATOR FOR VARIABLE CONDENSERS
Filed June 4, 1924
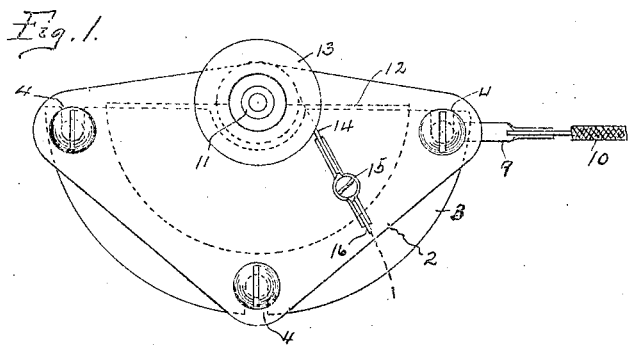
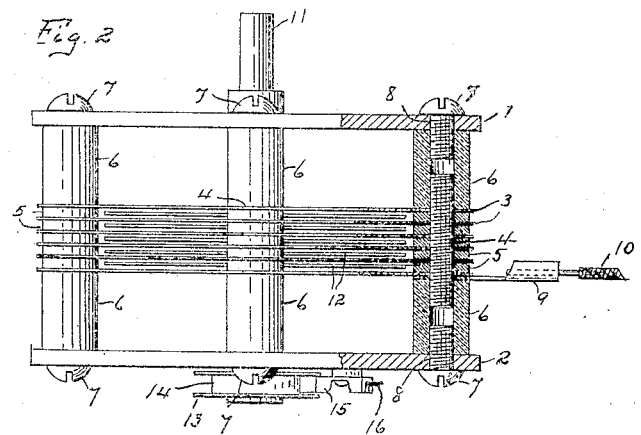

Patented Feb. 23, 1926.

1,574,269

UNITED STATES PATENT OFFICE.

PRESTON M. SMITH, OF EAST ORANGE, NEW JERSEY, ASSIGNOR TO U. S. TOOL COMPANY, INC., OF NEWARK, NEW JERSEY, A CORPORATION OF NEW JERSEY.

STATOR FOR VARIABLE CONDENSERS.

Application filed June 4, 1924. Serial No. 717,705.

*To all whom it may concern:*

Be it known that I, PRESTON M. SMITH, a citizen of the United States, and resident of the city of East Orange, county of Essex, State of New Jersey, have invented a new and useful Improvement in Stators for Variable Condensers, of which the following is a specification.

In the operation of radio telephony the variable condenser forms a very important part, and much attention has been given to the improvement of its construction, whereby the capacity losses shall be reduced to a minimum. Numerous tests have developed a fact that there is a certain definite and measurable capacity loss between the outer plates of the stator and the ends of the frame. To reduce or eliminate these capacity losses is the principle object of my invention.

The improved construction lends itself admirably to quick and convenient assembly of the parts so that in quantity production the same force of operatives are able to assemble a larger number of condensers of the improved construction than was possible with the older forms in common use.

In carrying out my invention the same general contour of parts has been preserved, but the details of construction have been so changed as to enable me to accomplish the results above set forth.

In the drawing Fig. 1 is an end view of the condenser. Fig. 2 is a bottom plan view of the same, partly in section. Similar reference numerals refer to like parts throughout the specification and drawing.

The stator frame comprises a pair of triangular metallic end plates 1, 2. Between these end plates are located a plurality of sheet metal plates 3, of general semi-circular form, notched at 4 to facilitate the mounting in the frame. The plates 3 are supported upon screw threaded posts 4 and spaced apart by the spacing washers 5. On each end of the bolt 4, outside of the outer plates 3, are screwed the two internally screw threaded insulating members 6, 6. As thus assembled it will be noted that the metallic plates 3 are all held together as a unit by the posts 4 and insulating members 6. The end plates 1, 2 are next applied and held in place by the headed bolts 7 which pass through apertures 8 in the end plates 1, 2, and are screwed into the outer ends of the insulating members 6 as clearly shown in Fig. 2. It will be noted that the ends of the posts 4 are separated a considerable distance from the inner ends of the bolts 7 so that the end plates 1, 2 are completely insulated from the stator plates 3 and that the stator plates are so removed or spaced away from the end plates as to make a very wide air-gap, thereby reducing to an inappreciable minimum the capacity losses between the stator plates 3 and the end plates 1, 2.

In order to provide a circuit lead for the stator plates 1, which it will be understood are in metallic connection through the metal spacing washers 5, I provide the clip 9 locating the same between one of the insulating members 6 and the adjacent stator plate 2 as clearly shown in Fig. 2. The circuit wire 10 may be conveniently soldered into this clip. In this manner a single substantially unitary stator is provided whereby the stator plates are completely insulated from the end frame plates 1, 2, thereby reducing capacity loses in the structure. The usual rotor shaft 11, is mounted in the end plates 1, 2 and has mounted thereon the plurality of rotor plates 12, which are interleaved as usual between the stator plates 3. At the lower end of the rotor shaft I mount a spool 13 upon which the pigtail connection 14 is coiled with its end leading to a clip 15, within which it is soldered and from which a circuit wire 16 leads.

From the foregoing it will be seen that the structure is exceedingly simple and yet from its nature is strong and capable of withstanding comparatively rough usage. The separation of the ends of the bolts 7 from the posts 4 affords an air-gap within the tubular insulating members 6 so as to reduce all possible source of capacity loss between the stator plates 3 and the plates 1, 2. The tubular insulating members 6 may be of hard rubber, fiber, bakelite, or any of the well recognized dielectric materials and they form the sole support between the rotor plates and the frame of the condenser.

I claim:—

1. In a condenser, the combination of a pair of end plates, means for connecting said plates together comprising a plurality of screw threaded posts, tubular insulating members screwed upon the ends of each of said posts, and screws passing through apertures in said plates and screwed into the ends of said tubular members, with a plurality of stator plates spaced apart and supported upon said posts between said tubular members.

2. In a condenser, the combination of a pair of metallic end plates, means for rigidly supporting a plurality of conductor plates between said end plates, comprising a plurality of screw threaded posts upon which said conductor plates are mounted in relatively spaced relation, tubular insulating members screwed upon the ends of said posts outside of said conductor plates and screws passing through apertures in said end plates and screwed into the ends of said tubular members, whereby said end plates are completely insulated from said conductor plates.

PRESTON M. SMITH.